United States Patent [19]

Schülke

[11] 4,349,203
[45] Sep. 14, 1982

[54] FLANGE CONNECTION TO CONNECT A METALLIC AND A GLASS OR CERAMIC STRUCTURAL ELEMENT

[75] Inventor: Karl A. Schülke, Neuberg, Fed. Rep. of Germany

[73] Assignee: Heraeus Quarzschmelze GmbH, Hanau, Fed. Rep. of Germany

[21] Appl. No.: 290,885

[22] Filed: Aug. 7, 1981

[30] Foreign Application Priority Data

Sep. 10, 1980 [DE] Fed. Rep. of Germany ....... 3033989

[51] Int. Cl.³ .............................................. F16J 15/10
[52] U.S. Cl. ...................................... 277/26; 277/101; 277/165; 277/172; 277/236; 285/187; 285/332.3; 285/DIG. 12
[58] Field of Search ................. 277/26, 101, 128, 144, 277/145, 165, 167.5, 170–172, 236; 285/187, 332.3, 174, DIG. 12

[56] References Cited

U.S. PATENT DOCUMENTS

| | | | |
|---|---|---|---|
| 904,673 | 11/1908 | Bideker | 285/332.3 |
| 3,016,248 | 1/1962 | Lindberg | 285/332.3 X |
| 3,140,097 | 7/1964 | Luertzing | 285/DIG. 12 X |
| 3,301,577 | 1/1967 | Latham | 277/26 X |
| 3,476,413 | 11/1969 | Coberly et al. | 285/332.3 |
| 3,632,143 | 1/1972 | Lessmann | 285/187 |
| 3,667,785 | 6/1972 | Kapeker | 285/DIG. 12 X |

FOREIGN PATENT DOCUMENTS

| | | | |
|---|---|---|---|
| 227309 | 3/1960 | Australia | 285/187 |
| 2459661 | 7/1976 | Fed. Rep. of Germany | 285/DIG. 12 |

Primary Examiner—Robert S. Ward, Jr.
Attorney, Agent, or Firm—Frishauf, Holtz, Goodman & Woodward

[57] ABSTRACT

To provide a flange connection between two materials of substantially different thermal coefficient of expansion, for example a glass, typically quartz glass or ceramic material and a metallic material, for example cast iron or steel, with an interposed sealing ring of an elastomer, for example rubber, the flange seating surfaces are formed at an angle of inclination with respect to the central axis of the tubes to define a shallow cone having a cone angle ($\alpha$) defined by arc tan $\mu_0$, in which $\mu_0$ is the coefficient of friction between the material of the sealing ring and the adjacent material which includes the theoretical core of the cone, typically the glass or ceramic element forming the connection, the maximum cone angle being 45°. One of the elements, typically the metal element, can be formed with a groove to receive a portion of the sealing ring and locate it in position.

10 Claims, 1 Drawing Figure

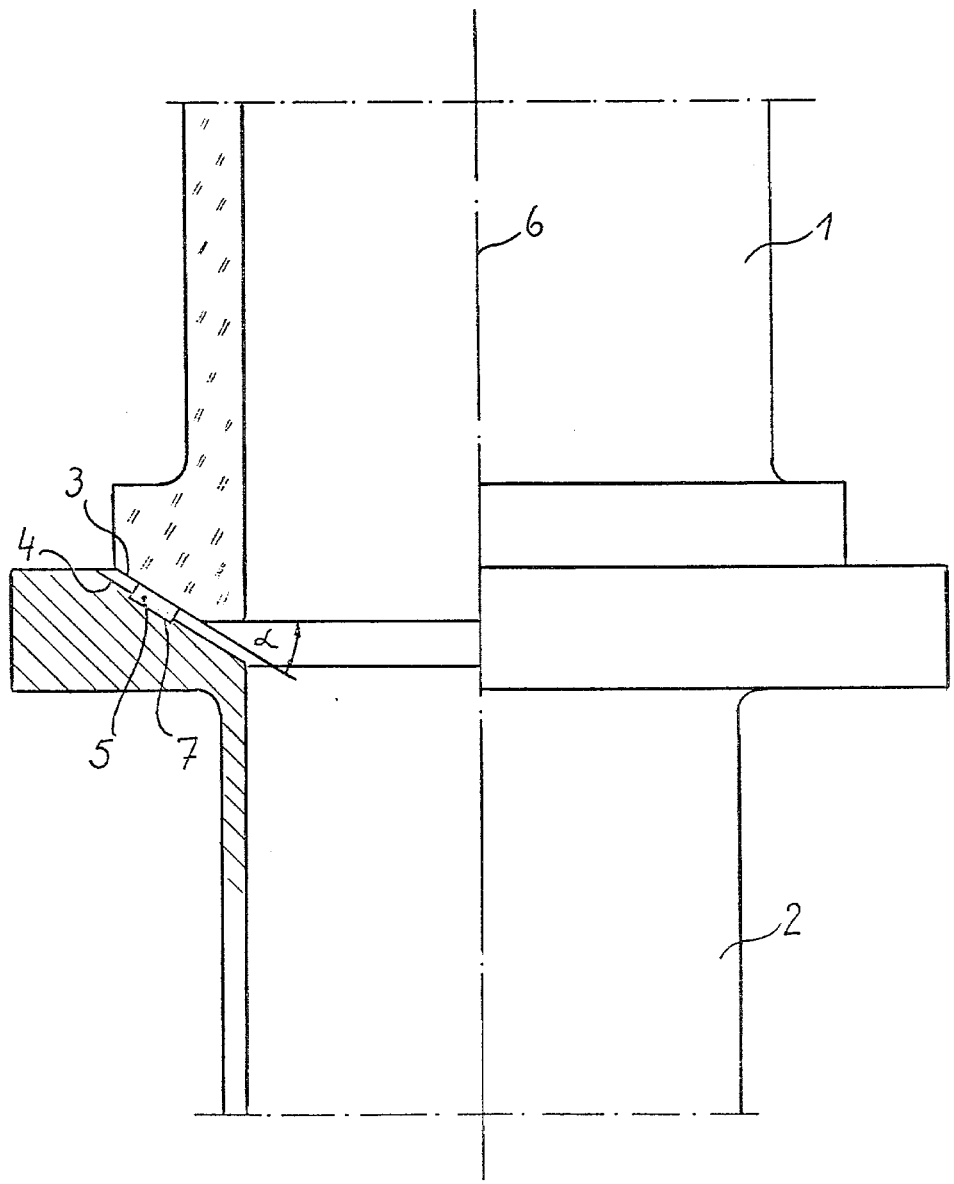

FLANGE CONNECTION TO CONNECT A METALLIC AND A GLASS OR CERAMIC STRUCTURAL ELEMENT

The present invention relates to a flange connection to connect a glass or ceramic structural element to a metal structural element with interposition of a non-metallic sealing element, and more particularly to a flange connection to interconnect tubes or pipes by the flange, in which the respective flange surfaces are parallel to each other.

BACKGROUND

Many types of chemical and physical apparatus resuire connection between a metallic and a non-metallic, typically glass or ceramic element. These two elements have substantially different thermal coefficients of expansion, and under thermal loading, the flange connections have the tendency to cause difficulties. For example, upon increase in temperature, the substantially different thermal coefficients of expansion of glass or ceramic and of metal have the tendency to cause fracture of the glass or ceramic element which is essentially brittle. The fracture, or failure of the flange connection, is due to the increased tension in the glass or ceramic material.

THE INVENTION

It is an object to provide a flange connection between two structural elements of substantially different thermal coefficient of expansion, typically of a glass or ceramic pipe or tube and a metal pipe or tube, and to maintain the connection in spite of even substantial variations in temperature.

Briefly, the respectively parallel and mutually matching sealing or seating surfaces of the connection extend at an inclination with respect to the common axis of the elements to be connected and form a shallow cone. A non-metallic sealing ring is provided, interposed between the surfaces. The theoretical apex of the shallow cone is placed in the center of the axis of one of the elements; the seating surfaces form a cone angle with respect to a plane perpendicular to the axis which is defined by arc tan $\mu_0$, in which $\mu_0$ is the frictional coefficient between the sealing ring or sealing element and the material which includes the theoretical core of the theoretical cone, the angle, however, not exceeding 45°.

The flange connection has the advantage that danger of fracture of one of the elements when connected with an element of substantially different thermal coefficient of expansion is reduced to a negligible remainder.

The connection which is constructed within the parameters as defined herein will place the flange connection of a tubular glass or ceramic element with another one only under compressive force, that is, a force which the glass of ceramic material can accept, so that breakage due to tension forces, against which the materials are weak, are essentially avoided.

DRAWING

The single FIGURE is a side view and part-axial section of a flange connection between a glass or ceramic tube and a metal tube.

A tubular structural element 1, made of a glass or ceramic material, is to be connected to a tubular element 2 made of any metal. The thermal coefficients of expansion of the metal and of the glass or ceramic elements 2 and 1, respectively, are substantially different. In one form of the invention, the element 1 is made of opaque molten quartz glass, the element 2 of steel. A flange seating surface 3 is formed on the flange of the element 1, and a matching seating surface 4 is formed on the flange of the element 2. The surfaces are sealed with respect to each other by a sealing ring 5 which, for example, may be made of rubber or any other elastomer material. The sealing surfaces 3, 4 are inclined with respect to the common axis 6 of the tubes and form a shallow conical surface in which the theoretical core of the cone is formed by the glass or ceramic element 1. The cone angle of inclination is at least arc tan $\mu_0$, but does not exceed, in any event, 45°. In the example selected, $\mu_0 = 0.625$ for rubber on ground opaque molten quartz glass. Substituting this value $\mu_0$ then will correspond to a cone angle $\alpha$ of 32°.

When constructing the flange connection as described, the distribution of forces upon expansion due to heating of the metal part will be such that only compressive forces will act on the element 1.

In a preferred form of the invention, the element 2 is formed with a groove 7 to receive a portion of the sealing ring 5, so that it will be positively located between the seating surfaces 3, 4. The flanges 1, 2 are held together by external clamps or the like, not shown, and of any suitable standard construction.

I claim:

1. Flange connection between two coaxial tubular elements (1, 2) having substantially different thermal coefficients of expansion, and particularly for use in connections wherein one the elements is brittle and has low tensile strength in comparison to that of the other,
   wherein each of said elements is formed with mutually matching seating surfaces (3, 4), and an elastic sealing ring (5) is provided, interposed between said seating surfaces,
   and wherein, in accordance with the invention,
   the seating surfaces extend at an inclination with respect to the common axis (6) of the tubular elements and form a shallow truncated cone having its theoretical apex in the center of said axis (6) of one of the elements;
   and the seating surfaces form a cone angle ($\alpha$) with respect to a plane perpendicular to said axis, which angle ($\alpha$) is at least arc tan $\mu_0$, and up to 45°,
   wherein $\mu_0$ is defined by the coefficient of friction between the sealing material and that one of the elements which includes the cone as a theoretical core.

2. Flange connection according to claim 1, wherein one of the elements (1) comprises a glass or ceramic material, and the other of said elements (2) comprises a metal.

3. Flange connection according to claim 1, wherein the sealing ring comprises an elastomer.

4. Flange connection according to claim 2, wherein the core of the theoretical cone is included in the glass or ceramic element.

5. Flange connection according to claim 1, wherein one of said elements (1) comprises opaque, molten quartz material, and the other tubular element (2) comprises a ferrous material;
   and wherein the theoretical core of the theoretical cone is included in the quartz material.

6. Flange connection according to claim 5, wherein the other element comprises steel or cast iron.

7. Flange connection according to claim 1, further including a groove (7) formed in the seating surface of one of said elements to receive said sealing ring (5).

8. Flange connection according to claim 2, wherein the other element comprises steel or cast iron.

9. Flange connection according to claim 8, further including a groove (7) formed in the seating surface of one of said elements to receive said sealing ring (5).

10. Flange connection according to claim 9, wherein the sealing ring comprises an elastomer.

* * * * *